US006496546B1

(12) United States Patent
Allpress et al.

(10) Patent No.: US 6,496,546 B1
(45) Date of Patent: Dec. 17, 2002

(54) SOFTWARE-DEFINED TRANSCEIVER FOR A WIRELESS TELECOMMUNICATIONS SYSTEM

(75) Inventors: Stephen Alan Allpress, Hoboken, NJ (US); Sridhar Arunachalam, Plainsboro, NJ (US); Reza Mardani, Flanders, NJ (US); Carmine James Pagano, II, Blairstown, NJ (US); Joseph Anthony Tarallo, Flanders, NJ (US); Tiejun Shan, Old Bridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/115,933

(22) Filed: Jul. 15, 1998

(51) Int. Cl.[7] .............................. H04B 1/16; H04L 27/06
(52) U.S. Cl. ........................................ 375/316; 375/321
(58) Field of Search ................................. 375/260, 270, 375/316, 321, 324, 328, 225, 329; 329/304; 455/226.3; 341/61; 708/313

(56) References Cited

U.S. PATENT DOCUMENTS

| | | | |
|---|---|---|---|
| 5,396,489 A | | 3/1995 | Harrison |
| 5,535,240 A | | 7/1996 | Carney et al. |
| 5,606,575 A | | 2/1997 | Williams |
| 5,630,218 A | * | 5/1997 | Muto ...................... 455/226.2 |
| 5,764,704 A | * | 6/1997 | Shenoi ...................... 375/324 |
| 5,668,837 A | * | 9/1997 | Dent ........................ 375/316 |
| 5,867,479 A | * | 2/1999 | Butash ...................... 370/210 |
| 5,872,480 A | * | 2/1999 | Huang ...................... 329/304 |
| 6,002,352 A | * | 12/1999 | El-Ghoroury et al. ...... 341/139 |
| 6,252,909 B1 | * | 6/2001 | Tzannes et al. ............. 375/260 |
| 6,256,358 B1 | * | 7/2001 | Whitehart et al. .......... 375/316 |

OTHER PUBLICATIONS

Eugene B. Hogenauer, "An Economical Class of Digital Filters for Decimation and Interpolation," IEEE Transactions on Acoustics, Speech, and Signal Processing, vol. ASSP–29, No. 2, Apr. 1981, pp. 155–62.
Joe Mitola, "The Software Radio Architecture," IEEE Communications Magazine, May 1995, pp. 26–38.
Jeffery A Wepman, "Analog–to–Digital Converters amd Their Applications in Radio Receivers," IEEE Communications Magazine, May 1995, pp. 39–45.
P. P. Vaidyanathan, "Multirate Digital Filters, Filter Banks, Polyphase Networks, and Applications: A Tutorial," Proceedings of the IEEE, vol. 78 No. 1, Jan. 1990, pp. 56–93.

* cited by examiner

Primary Examiner—Young T. Tse
(74) Attorney, Agent, or Firm—DeMont & Breyer, LLC (57) ABSTRACT

A technique for receiving and transmitting wireless telecommunications through use of a generic architecture is disclosed. The present invention mitigates the complexity of different transceiver operations by allowing a generic architecture to be used in a variety of situations with different channels and different telecommunications standards. An illustrative embodiment of the present invention comprises: receiving uplink analog RF signals at a base station; converting the uplink analog wide-band RF signals into IF uplink digital signals at an analog-to-digital converter; converting the IF uplink digital signals into a number of uplink channels; and demodulating selected narrow-band uplink channels from the total number of narrow-band uplink channels.

16 Claims, 10 Drawing Sheets

*FIG. 6A*
PRIOR ART
POLYPHASE FILTER FOR SOFTWARE-DEFINED RECEIVER

FIG. 9A
PRIOR ART
POLYPHASE FILTER FOR SOFTWARE-DEFINED TRANSMITTER

SOFTWARE-DEFINED TRANSCEIVER FOR A WIRELESS TELECOMMUNICATIONS SYSTEM

FIELD OF THE INVENTION

The present invention relates to telecommunications in general, and, more particularly, to a technique for using a software-defined transceiver to support wireless telecommunications.

BACKGROUND OF THE INVENTION

Figure 1:
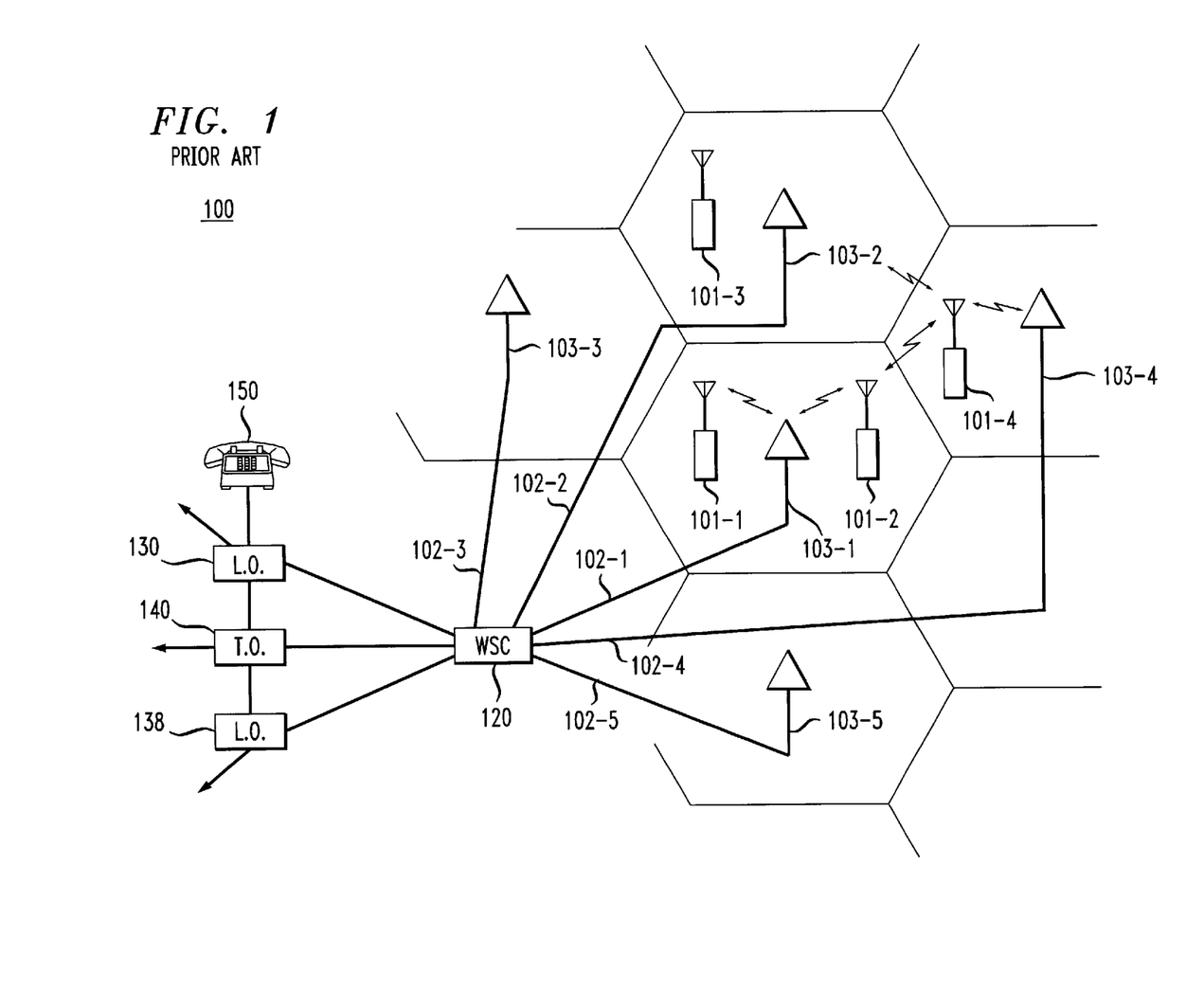
FIG. 1 depicts a schematic drawing of a wireless telecommunications system in the prior art.

FIG. 1 depicts a schematic diagram of a portion of a typical wireless telecommunications system in the prior art, which system provides wireless telecommunications service to a number of wireless terminals (e.g., wireless terminals 101-1 through 101-3) that are situated within a geographic region. The heart of a typical wireless telecommunications system is Wireless Switching Center ("WSC") 120, which may also be known as a Mobile Switching Center ("MSC") or Mobile Telephone Switching Office ("MTSO"). Typically, Wireless Switching Center 120 is connected to a plurality of base stations (e.g., base stations 103-1 through 103-5) that are dispersed throughout the geographic area serviced by the system and to the local and long-distance telephone and data networks (e.g. local-office 130, local-office 138 and toll-office 140). Wireless Switching Center 120 is responsible for, among other things, establishing and maintaining calls between wireless terminals and between a wireless terminal and a wireline terminal (e.g., wireline terminal 150), which is connected to the system via the local and/or long-distance networks.

The geographic region serviced by a wireless telecommunications system is partitioned into a number of spatially distinct areas called "cells." As depicted in FIG. 1, each cell is schematically represented by a hexagon; in practice, however, each cell usually has an irregular shape that depends on the topography of the terrain serviced by the system. Typically, each cell contains a base station, which comprises the radios and antennas that the base station uses to communicate with the wireless terminals in that cell and also comprises the transmission equipment that the base station uses to communicate with Wireless Switching Center 120.

For example, when wireless terminal 101-1 desires to communicate with wireless terminal 101-2, wireless terminal 101-1 transmits the desired information to base station 103-1, which relays the information to Wireless Switching Center 120 over wireline 102-1. Upon receipt of the information, and with the knowledge that it is intended for wireless terminal 101-2, Wireless Switching Center 120 then returns the information back to base station 103-1 over wireline 102-1, which relays the information, via radio, to wireless terminal 101-2.

Wireless terminals 101-1 and 101-2 may, however, operate under different wireless telecommunications standards (e.g., FDMA, TDMA, CDMA, etc.). Such different standards vary in numerous ways, including carrier frequencies, bandwidth, modulation scheme, to name but a few. To enable communication between wireless terminals 101-1 and 101-2 operating under such different standards, base station 103-1 must be able to provide the processing required to support both such telecommunications standards.

One prior art approach for supporting multiple telecommunications standards involves using duplicative hardware. In particular, for such an approach, base station 103-1 uses a first receiver/transmitter pair for communication with wireless terminal 101-1 and a second receive/transmitter pair for communication with wireless terminal 101-2. Such duplicative hardware increases base station cost.

As an alternative to using duplicative hardware, software-defined radios have been used as receivers and transmitters. With software-defined radios, an operator of a wireless telecommunications system can program a processor containing software and execute such software to both receive and transmit radio signals. To support the different telecommunications standards, the operator of the wireless telecommunications system will typically program the software processor with different programs to receive and transmit signals for the different systems employed within the telecommunications system. While more cost effective than using duplicative hardware, using multiple software programs to support different telecommunications disadvantageously requires software modifications whenever telecommunications standards are updated. The updating of numerous software programs can in itself be an expensive maintenance cost of an operating wireless telecommunications system.

While there have been attempts in the prior art to simplify transceiver operation via software-defined devices, such devices have typically been "standards specific." In other words, such devices include unique programming to support communications for a specific telecommunications standard. A software control logic package capable of handling communications supported by a variety of telecommunications standards would simplify transceiver operation and would be beneficial to the art. The efforts of the prior art notwithstanding, such desired simplification has, until now, remained elusive.

SUMMARY OF THE INVENTION

In some embodiments, the present invention provides a wireless telecommunications system that uses a transceiver having a generic architecture. For transceiver operation to be "generic," it must be able to handle a plurality of channels associated with each of a variety of telecommunications systems. Such a generic package, which would be installed unmodified at different locations operating under different standards, reduces the hardware costs associated with duplicative hardware and the maintenance requirements of duplicative software packages of the prior art.

Such a transceiver is operable to receive and transmit information-bearing signals over the variety of telecommunications systems and standards without hardware or software modifications thereto.

The present invention advantageously avoids the complexity of the prior art approaches, either hardware or software based. For example, in one embodiment of the present invention, a generic receiving section of a base station will reject channels that are not specifically allocated to the base station. Unlike a typical prior art receiver, there is no need to design or tune the receiver to handle the allocated channels. In other words, the same generic receiving section could be located in another base station and used to handle other channels allocated to the other base station without modification thereto.

An illustrative method in accordance with the present teachings comprises the operations of: receiving uplink analog RF signals at a base station; converting the uplink analog RF signals into IF uplink digital signals in an analog-to-digital converter; converting the IF uplink digital signals into a number of narrow-band uplink channels; and demodulating selected narrow-band uplink channels from the total number of narrow-band uplink channels.

DETAILED DESCRIPTION

Illustrative embodiments of the software-defined transceiver depicted and described herein are useful in communication of voice, data and image within a wireless telecommunications system. For such communications a base station broadcasts information to a multiplicity of clients (e.g., a wireless terminal, a computer operable to receive transmitted information, etc.) and receives information from such clients.

For clarity of explanation, a method in accordance with an illustrative embodiment of the present invention is presented as a collection of individual functional blocks. The functions of these blocks represent may be provided in a base station or at a location other than a base station, such as a remote control center servicing several base stations. The functions are performed by using either shared or dedicated hardware, including without limitation, (1) antenna for receiving and transmitting communications, (2) converters for (a) transforming signals between analog and digital modes, (b) combining signals contained on different carrier signals, (c) separating signals contained on common carrier signals, (3) modulators for modulating signals, (4) demodulators for demodulating signals, (5) resamplers for altering data rates of the signals, and (6) a controller capable of executing software. Illustrative embodiments of such software-executing controller comprise an appropriately programmed general purpose processor or hardwired special-purpose processor, read-only memory (ROM) for storing software performing the operations described herein and random-access memory (RAM) for storing processor results. For the purposes of this specification, "software-defined devices" are functional blocks performed by software residing in memory of the controller.

Figure 2:
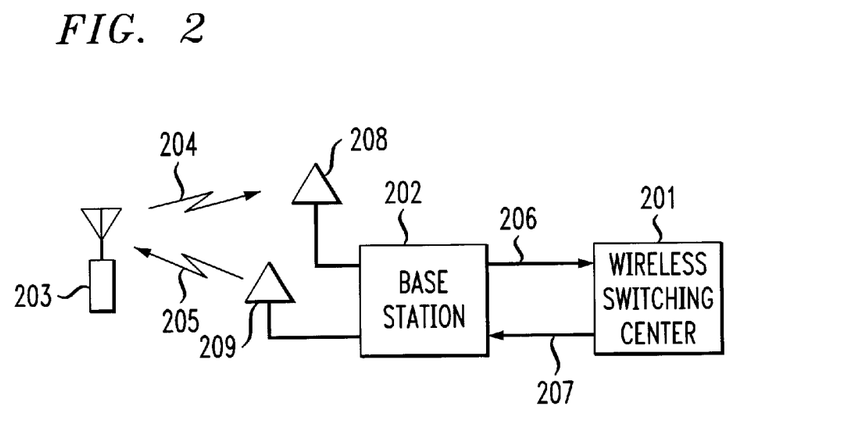
FIG. 2 depicts a schematic diagram of a portion of a wireless telecommunication system of the illustrative embodiment of the present invention.

FIG. 2 depicts a schematic diagram of a portion of the illustrative embodiment of the present invention, which comprises wireless switching center 201, base station 202, wireless terminal 203, receive antenna 208 and transmit antenna 209, interrelated as shown. Communications received from wireless terminal 203 at receive antenna 208 are carried over a reverse or uplink channel. Communications transmitted to wireless terminal 203 from transmit antenna 209 are carried over a forward or downlink channel. Base station 202 avoids some of the disadvantages associated with prior art techniques for processing telecommunications by utilizing a software architecture that is capable of supporting a variety of formats (e.g., voice, data, etc.) and a variety of telecommunications standards (GSM, IS-95, W-CDMA, IS-136, HSD, etc.).

Communications received at receive antenna 208 and transmitted from transmit antenna 209 are analog wide-band radio frequency (RF) signals. As used herein, the term "wide-band" refers to a band or a range of spectrum that contains multiple narrow-bands. As used herein, the term "narrowband" refers to a carrier band, which has a specified bandwidth for modulation and demodulation. Such carrier bands or specified bandwidths are specific to the different communications standards. For example, a narrow-band is defined as 30 kHz for TDMA (IS-136), and a signal of 15 MHz would be a wide-band signal because it would have 500 narrow-bands for the TDMA system (500=15 MHz/30 kHz).

Figure 3:
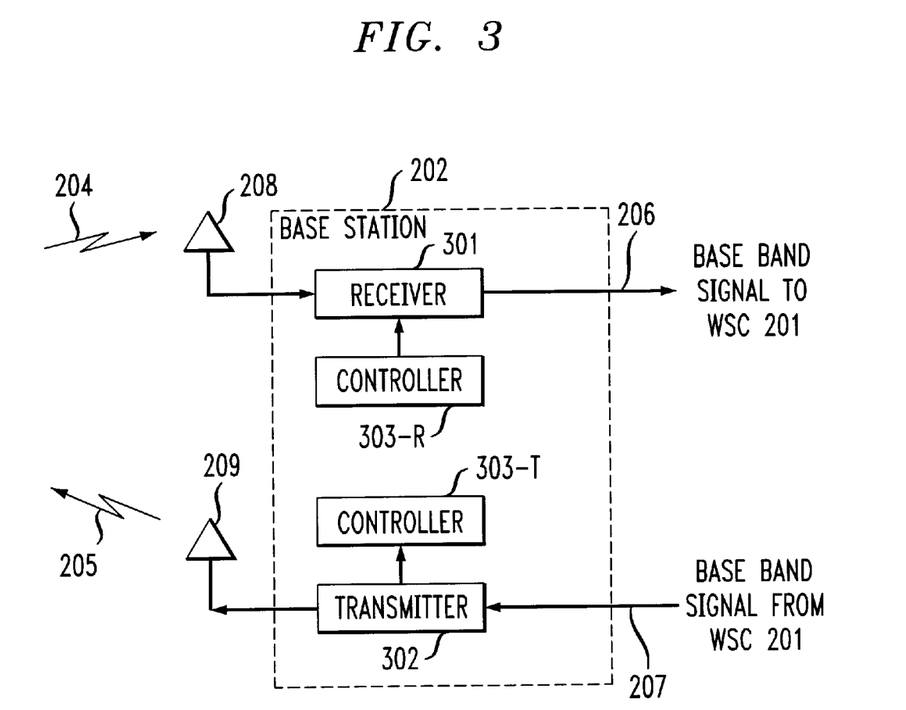
FIG. 3 depicts a schematic diagram of a portion of a base station of the illustrative embodiment of the present invention.

FIG. 3 depicts a schematic diagram of a portion of base station 202 of the illustrative embodiment of the present invention, which comprises receiver 301, controller 303-R, transmitter 302 and controller 303-T, interrelated as shown. Controller 303-R controls receiver 301, and controller 303-T controls transmitter 302. Receiver 301 receives uplink analog wide-band RF signals 204 at receive antenna 208, in well-known fashion, and forwards baseband output to wireless switching center 201 via wireline 206. Transmitter 302 receives baseband output from wireless switching center 201 via wireline 207 and transmits downlink analog wide-band RF signals 205 via transmit antenna 209, in well-known fashion. Receiver 301 and transmitter 302 are described in more detail below.

Figure 4:
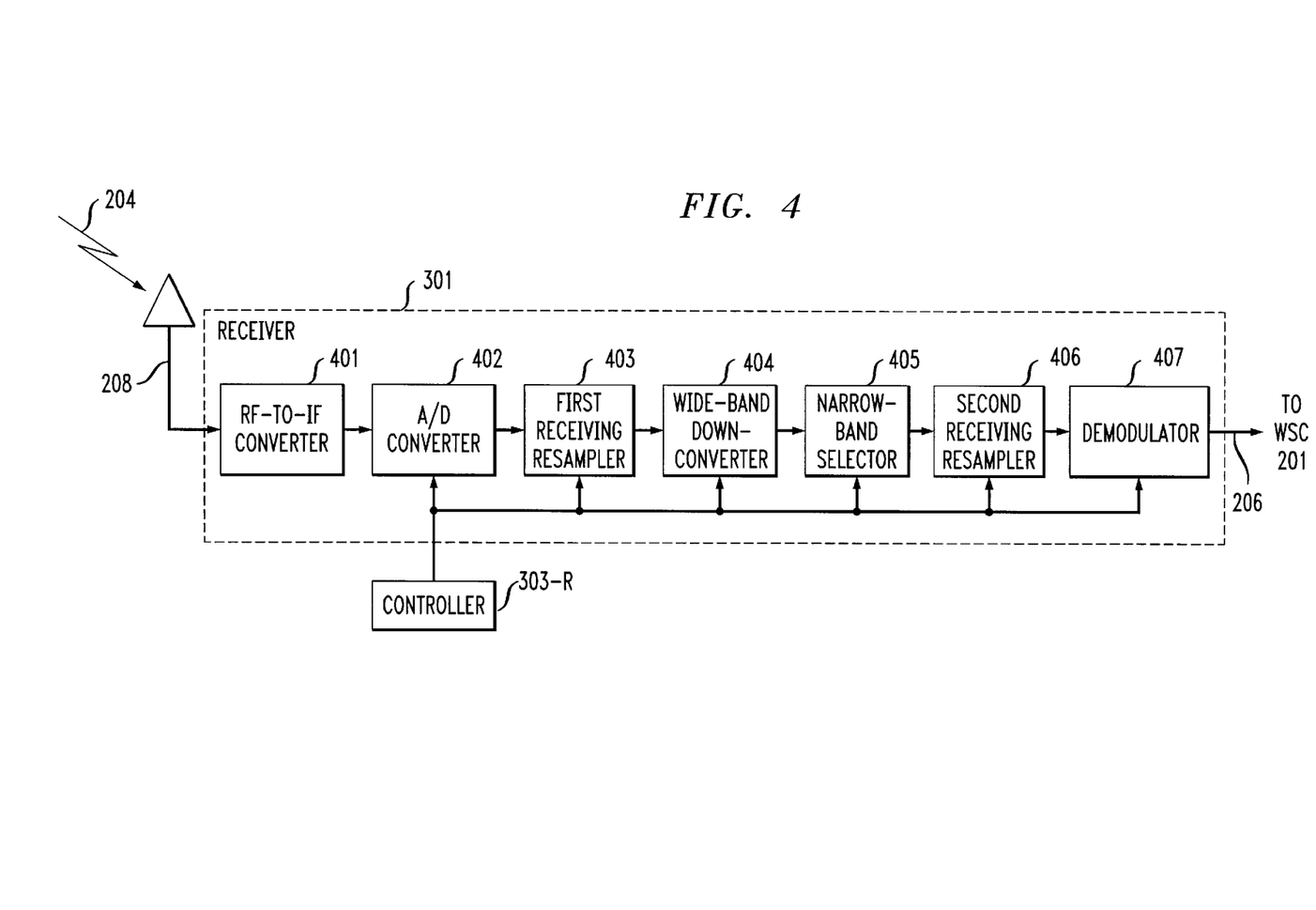
FIG. 4 depicts a schematic diagram of a portion of a receiving section of the base station of the illustrative embodiment of the present invention.

FIG. 4 depicts a schematic diagram of a portion of receiver 301 of the illustrative embodiment of the present invention, which comprises RF-to-IF converter 401, analog-to-digital converter 402, first receiving resampler 403, wide-band down-converter 404, narrow-band selector 405, second receiving resampler 406, demodulator 407 and controller 303-R, interconnected as shown. First receiving resampler 403, wide-band down-converter 404, narrow-band selector 405, and second receiving resampler 406 are software-defined devices; the functioning of which will be described below.

Figure 5:
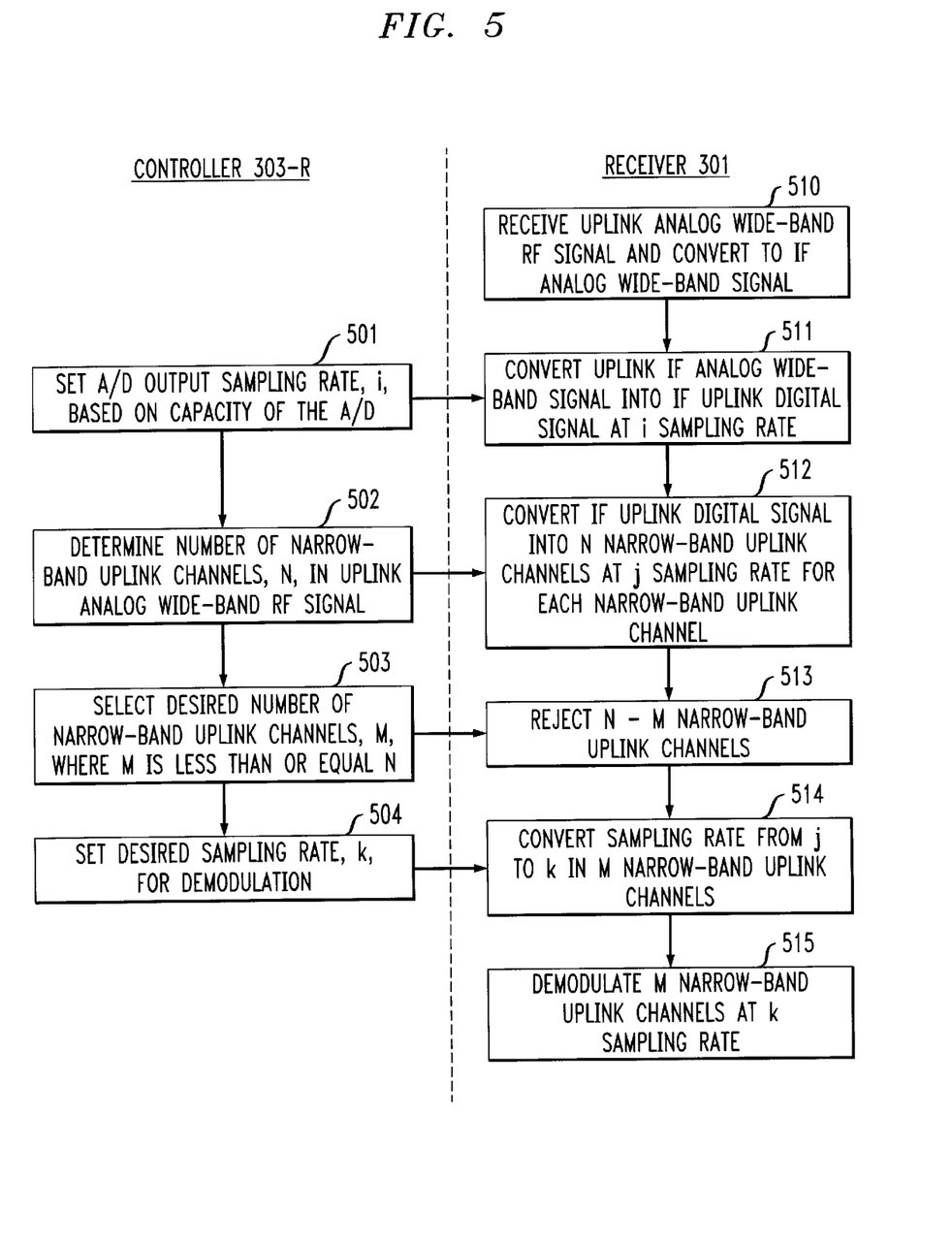
FIG. 5 depicts a flowchart of controller operations and receiver operations for processing uplink RF signals.

FIG. 5 depicts a flowchart of controller operations and receiver operations for processing uplink RF signals.

At step 510, receive antenna 208 receives an uplink analog wide-band RF signal and forwards it to RF-to-IF converter 401. RF-to-IF converter 401 contains filters, mixers and amplifiers for converting the analog wide-band RF signal to an intermediate frequency (IF) uplink analog wide-band signal, where the intermediate frequency (IF) typically is lower than the radio frequency (RF). The aforementioned receive and conversion operations are well known in the art.

At step 501, controller 303-R sets a sampling rate, i, hereinafter the i sampling rate, at analog-to-digital converter 402. In some embodiments, controller 303-R sets the i sampling rate based on the rated capacity of analog-to-digital converter 402. In other embodiments, other sampling rates may suitably be used.

The capacity of an analog-to-digital converter is typically selected based upon a desired bandwidth to be processed at a converter. For example, a typical TDMA system will often contain 500 channels, and the bandwidth encompassing these 500 channels typically sets the capacity of the analog-to-digital converter.

These 500 channels, however, are typically allocated among a number of neighboring cells to avoid using common channels in such cells by a technique referred to as frequency reuse. Frequency reuse will depend upon many variables (e.g.; communications traffic patterns; topology of the terrain; height, direction and power of antennas at the base stations; etc.). An operator of a telecommunications system seeks to maximize available channels in areas of high communications through frequency reuse. As an example, with a frequency reuse pattern of four, where the available channels are allocated to groups of four neighboring cells, each cell can be allocated 125 channels (500/4= 125). If the cell is divided into three sectors, then a base station receiver, which is dedicated to service one of the sectors, is expected to service about 42 carriers (125/3≈42). The analog-to-digital converter associated with such receiver will have a capacity to process the 500 carriers because frequency reuse is a dynamic and flexible scheme.

Assuming such analog-to-digital converter has the capacity to process 500 carriers, it may not always operate at such capacity. For example, when telecommunications traffic within a sector is allocated such that the 42 carriers are not widely dispersed throughout the 500 carriers, the number of channels to be processed at a receiver within such sector may be reduced. For example, the 42 carriers may be encompassed within a subset of 100 carriers out of the total 500 carriers. The converter associated with such a sector may process the 100 carriers at the rated capacity based on 500 channels, or the converter may process the 100 carriers at another rate, such as a rate that corresponds to the 100 channels. That decision is made by the operator of the telecommunications system, and controller 303-R sets the sampling rate based on such decision.

At step 511, analog-to digital converter 402 converts the IF uplink analog wide-band signal into an IF uplink digital signal, in well-known fashion.

At step 502, controller 303-R determines the number of narrow-band uplink channels, N, that are contained in the uplink analog wide-band RF signal. The number of channels is typically determined from the system requirements of the wireless telecommunications system, in well-known fashion. For example, in a typical TDMA system when a 15 MHz analog wide-band signal is processed, it will contain 500 narrow-band channels because such TDMA system defines narrow-band channels as 30 kHz channels.

At step 512, wide-band down-converter 404 advantageously converts the IF uplink digital signal into N narrow-band uplink channels. Details of this operation are depicted in FIG. 6, which is described below.

Figure 6:
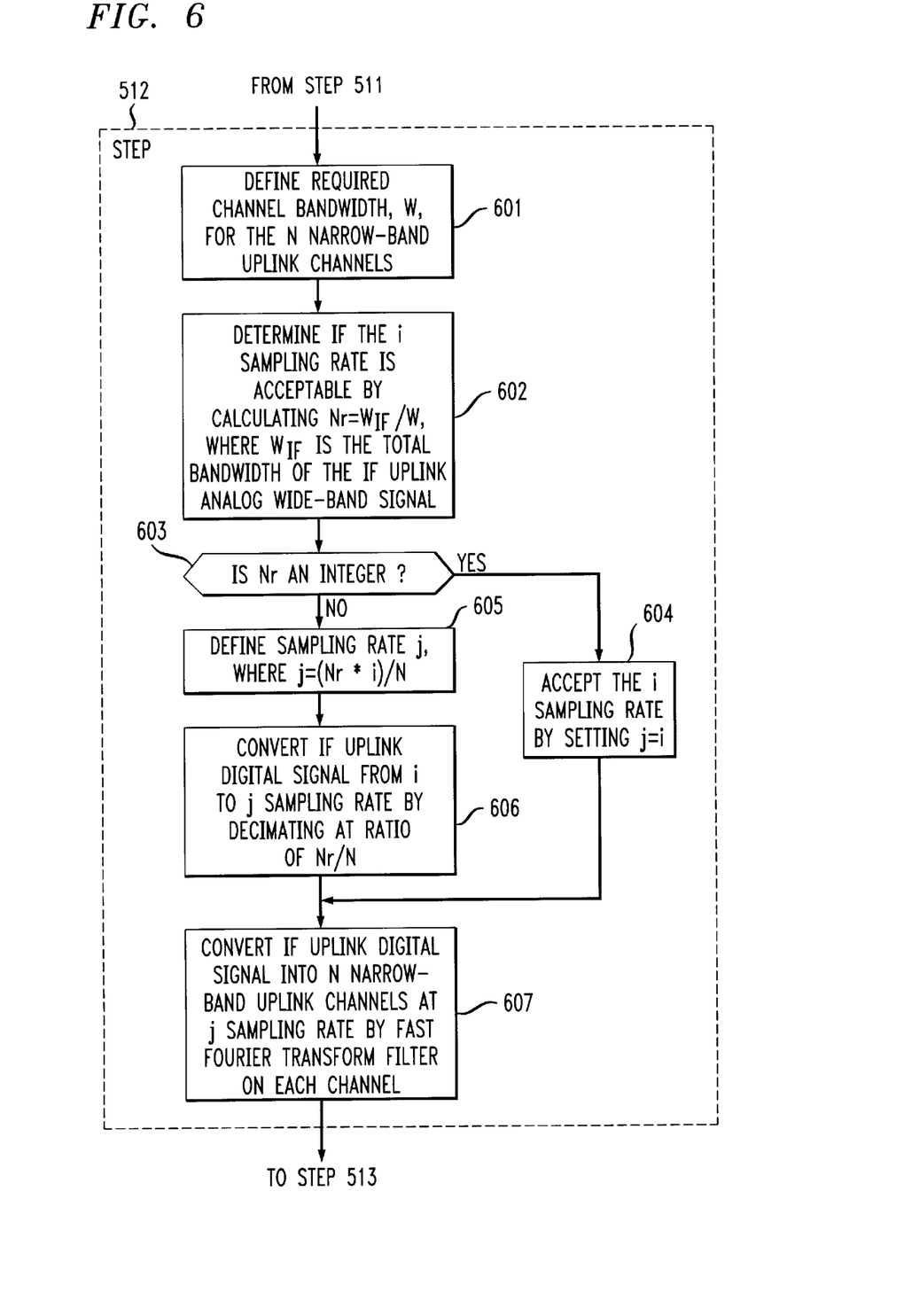
FIG. 6 depicts a flowchart of the operation of the present invention for processing of uplink RF channels.

FIG. 6 depicts a flow chart for the operation of the conversion of the IF uplink digital signal into N narrow-band uplink channels of the illustrative embodiment of the present invention.

At step 601, controller 303-R determines the required channel bandwidth, W, for each of the N narrow-band uplink channels based upon the telecommunications standards and system requirements of the telecommunications system. For example, for a typical TDMA system the required bandwidth is set at 30 kHz. For the purpose of describing the illustrative embodiment of the present invention, each of the N narrow-band uplink channels has a bandwidth of W. The present invention, however, is not limited to the processing of narrow-band uplink channels of a uniform bandwidth.

At step 602, controller 303-R determines whether the i sampling rate from analog-to-digital converter 402 is acceptable by calculating Nr, which is the ratio of the total bandwidth, $W_{IF}$, of the IF uplink analog wide-band signal to the required bandwidth, W, for each of the N narrow-band uplink channels. $W_{IF}$ is determined from the Nyquist rate, the required bandwidth and the number, N, of narrow-band channels, where $W_{IF} \geq N*W$. The Nyquist rate states that an analog signal must be sampled at least twice its bandwidth to digitally represent the information contained in such analog signal. Typically, controller 303-R sets $W_{IF}$ to minimum by sampling at the minimum Nyquist rate.

At step 603, controller 303-R determines if Nr is an integer, in well-known fashion.

If Nr is not an integer, then at step 605 controller 303-R defines a sampling rate, j, hereinafter the j sampling rate, where j=(Nr*i)/N.

At step 606, first receiver sampler 403 decimates the IF uplink digital signal at a ratio of Nr/N (or at the j sampling rate), when Nr is not an integer. Decimating a digital signal decreases the sampling rate of such signal through a process of filtering and downsampling. If a digital signal has a sampling rate of R, a decimator will decrease the sampling rate by a factor, D, to produce a new sampling rate of R/D by systematically deleting data. For example, when a signal has a sampling rate of 9 and is decimated by a factor of three, the decimator in the downsampling process will delete data points to form a new signal with a sampling rate of 3. In this example, a decimator performs integer decimation because the D factor is an integer. Fractional decimation is also possible and is typically achieved through a combination of decimation and interpolation.

An interpolator will increase sampling rate by a factor, L, by interpolating between units of data to produce a new sampling rate of L*R. A resampler will typically contain decimators and interpolators to change the sampling rate of a signal from R to R*L/D. If L>D, then the resampler is performing fractional interpolation. If L<D, then the resampler is performing fractional decimation. If L=D, then the rate is unchanged. For example, if a sampling rate is to be reduced by ⅗ (fractional decimation), this could be achieved as a cascade of an interpolator (L=3) followed by a decimator (D=5).

The j sampling rate, however, should be set to be able to reconstruct the signal without loss of signal information. Loss of signal information is avoided per the Nyquist theorem by setting the sampling rate for a channel at a rate of at least twice the bandwidth of the channel, in well-known fashion. The j sampling rate is set as an integer multiple of channel bandwidth. The j sampling rate is also a sampling rate at the output of a polyphase filter bank, which will be described below in conjunction with FIG. 6A.

If Nr is an integer, then at step 604 controller 303-R accepts the i sampling rate by setting the j sampling rate equal to the i sampling rate.

Figure 6A:
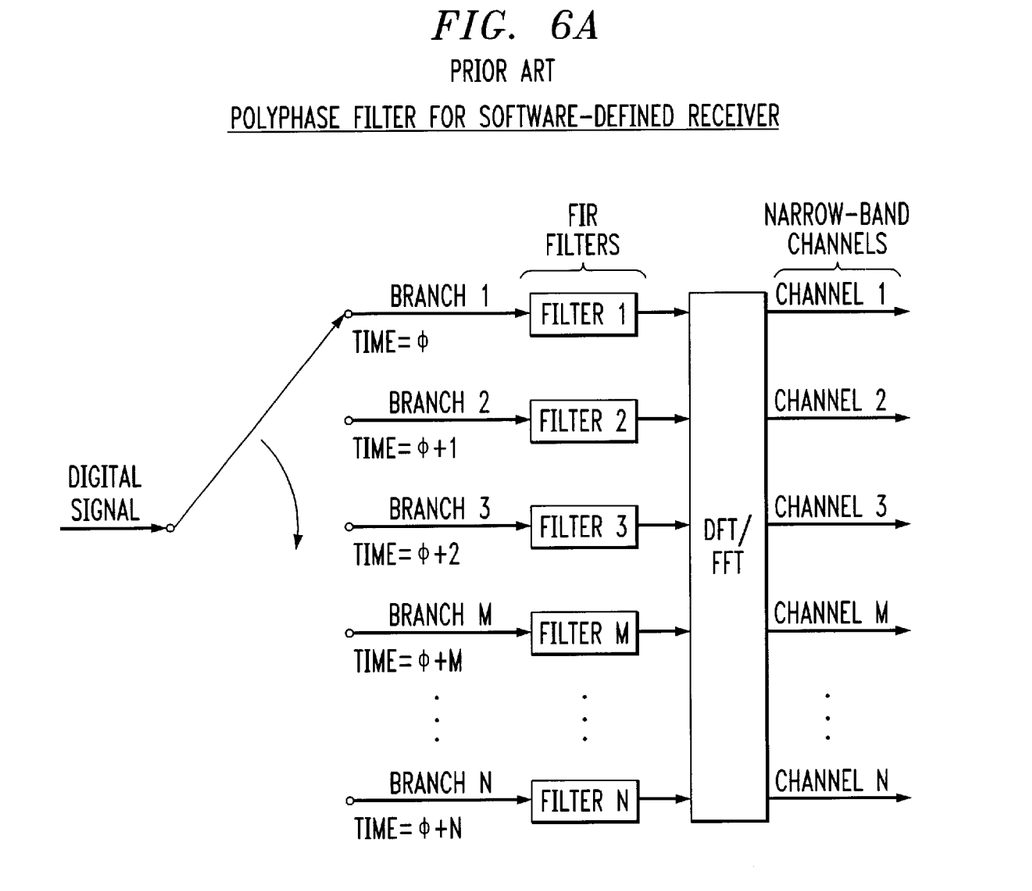
FIG. 6A depicts a schematic diagram for a digital signal into uplink channels.

At step 607, wide-band down-converter 404 converts the IF uplink digital signal into N narrow band uplink channels at the j sampling rate by a multirate filter bank, such as a Fast Fourier transform filter (FFT), on each channel, in well-known fashion. As depicted in FIG. 6A, the digital signal is divided into a number, N, of branches by separating the digital signal on a time basis by a time constant, φ. Each branch contains a Finite Impulse Filter (FIR) in which the separate digital signals are stored. The separate digital signals are stored in locations or taps within the FIR filters. The output digital signals from the FIR filters enter a Discrete Fourier Transform (DFT), such as a Fast Fourier Transform (FFT), where the separate digital signals are organized into N channels each having a bandwidth (or sampling rate) of W. Such an arrangement of FIR filters followed by a FFT transform is called a polyphase filter. Polyphase filters can be cascaded for several stages to transform the wide-band analog RF signal into a large number of narrow-band channels, in well-known fashion. A large number of narrow-band channels are not typically formed within a single stage polyphase filter because the size of that polyphase filter would become too large to effectively process all the channels.

Returning to step 503 of FIG. 5., controller 303-R selects the desired number of narrow-band uplink channels, M, where M≦N. It will be clear to those skilled in the art how to determine the number of M desired channels. For example, a wireless telecommunications company may allocate 12 channels out of a total of 20 narrow-band channels for its telecommunications service at a particular base station. Controller 303-R will then select these 12 desired channels out of the 20 narrow-band channels.

At step 513, narrow-band selector 405 rejects the N–M narrow-band uplink channels. The rejection is accomplished by avoiding further processing of the N–M narrow-band uplink channels. The locations in memory of the N–M narrow-band uplink channels are known to controller 303-R, and digital signals associated with the N–M narrow-band uplink channels are systematically deleted from memory of controller 303-R to conserve its memory. The M narrow-band uplink channels are forwarded for modulation.

At step 504, controller 303-R sets sampling rate, k, for demodulation of the M narrow-band uplink channels. The k sampling rate is determined by demodulation requirements, in well-known fashion, and is inputted to controller 303-R by the operator of a wireless telecommunications system. For example, in a TDMA system a minimum data rate of 24.3 kHz is set for demodulation. The actual rate of demodulation is typically set at multiples of the minimum rate (e.g., 24.3, 48.6, 97.2, etc.) is based upon receiving sensitivity of the demodulators.

Because the k sampling rate for demodulation is based upon equipment limitations of the demodulators, the k sampling rate may be a different rate than the j sampling rate. At step 514, second receiving resampler 406 converts, if necessary, the j sampling rate to the k sampling rate. When k is less than j, second receiving resampler 406 will decimate the M narrow-band uplink channels. When k is greater than j, second receiving resampler 406 will interpolate the digital data in the M narrow-band uplink channels. A cascaded integrator-comb (CIC) filter bank or a Farrow-Filter followed by an array conversion filter that uses the nearest neighbor rule and linear interpolation will achieve the interpolation or the decimation at second receiving resampler 406, in well-known fashion. CIC filters are a class of linear phase FIR filters for decimation and interpolation, and the CIC structure consists of an integrator section operating at a high sampling rate followed by a comb section operating at a low sampling rate, which results in reduced storage requirements. See, Hogenauer, "An Economical Class of Digital Filters for Decimation and Interpolation," vol. Assp-29 No. 2, IEEE Transactions on Acoustics, Speech, and Signal Processing, pp. 155–62, 1981. A Farrow Filter is a multirate filter structure that offers the option of a continuously adjustable resample ratio. Such adjustable resample ratio is accomplished by (1) describing partitions of an over-sampled polyphase filter as low order polynomials, (2) using the low order polynomials to approximate filter coefficients and (3) altering the number of filter stages through interpolation of the low order polynomials.

If k bit rate is equal to the j bit rate, then no decimation or interpolation is required for modulation. It will be clear to those skilled in the art when and how to select interpolation, decimation, or neither operation for preparing the M narrow-band uplink channels for demodulation by comparing the j sampling rate into second receiving resampler 406 with the k modulation rate of the telecommunications system.

At step 515, demodulator 407 demodulates the M narrow-band uplink channels and forwards them to wireless switching center 201. The present invention is not limited to any particular type of demodulation (e.g., amplitude demodulation, frequency demodulation or phase demodulation). The present invention sets the k sampling rate for demodulation at second receiving resampler 406, and demodulator 407 processes the k sampling rate according to the demodulation scheme used by the telecommunications system.

The transmitting section of the illustrative embodiment of the present invention will be described below.

Figure 7:
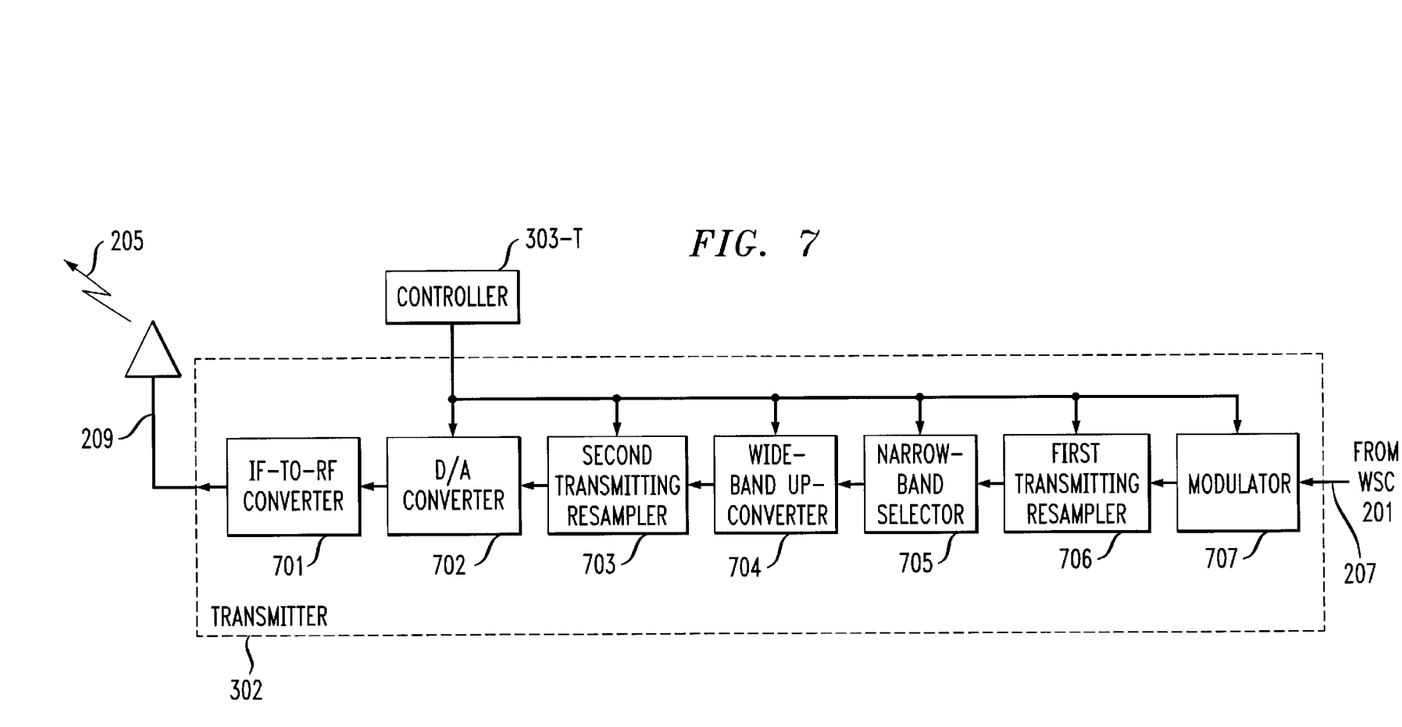
FIG. 7 depicts a schematic diagram of a portion of a transmitting section of the base station of the illustrative embodiment of the present invention.

As depicted in FIG. 7 transmitter 302 comprises IF-to-RF converter 701, digital-to-analog converter 702, second transmitting resampler 703, wide-band up-converter 704, narrow-band selector 705, first transmitting resampler 706, modulator 707 and controller 303-T, interrelated as shown. For illustrative purposes controller 303-T, which controls transmitter 302, and controller 303-R, which controls receiver 301, are depicted as separate devices. It should be understood, however, that a single controller can be used to control both the receiving and transmitting sections.

Second transmitting resampler 703, wide-band up-converter 704, narrow-band selector 705, and first transmitting resampler 706 are software-defined devices, the functioning of which will be described below.

Figure 8:
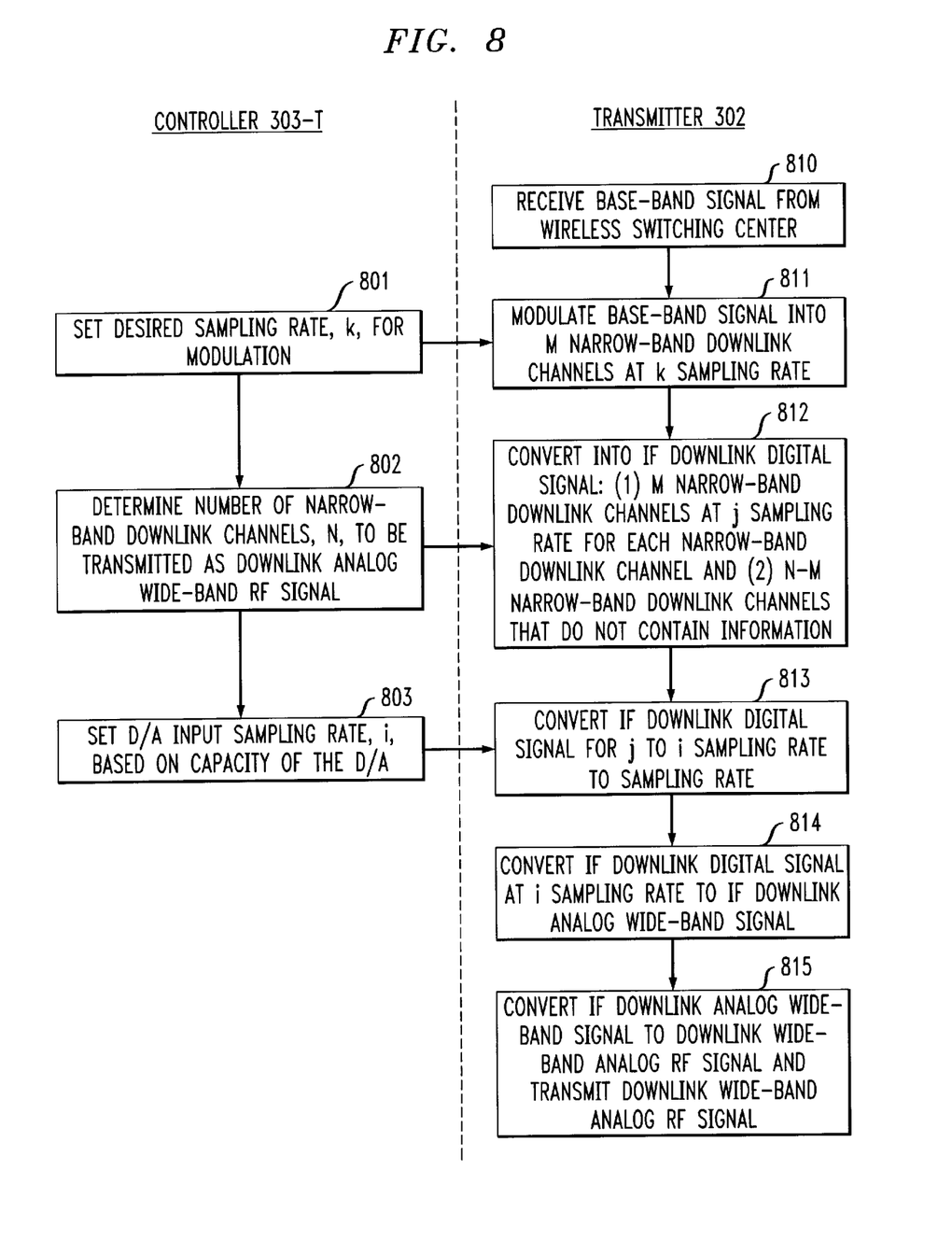
FIG. 8 depicts a flowchart of controller and transmitter operations for processing of downlink RF signals.

FIG. 8 is a flowchart depicting an illustrative method for transmitting downlink analog wideband RF signals in accordance with the present teachings.

At step 810, modulator 707 receives M base-band signals from wireless switching center 201 via wireline 207, in well-known fashion. Each base-band signal represents a narrow-band channel. The present invention is not limited to any particular type of modulation (e.g., amplitude modulation, frequency modulation or phase modulation). The present invention processes the signals according to the modulation scheme used by the telecommunications system.

At step 801, controller 303-T sets a desired sampling rate, k, for modulating the base-band signals from wireless switching center 201. The k sampling rate is typically set by the operator of a telecommunications system based upon transmitting sensitivity of modulator 707 and modulation requirements of the telecommunications system. For example, in a TDMA system a minimum data rate of 24.3 kHz is set for modulation. The actual rate of modulation is typically set at multiples of the minimum rate (e.g., 24.3, 48.6, 97.2, etc.) and is based upon transmitting sensitivity of the modulators. The operator of the telecommunications system inputs such appropriate sampling rate for modulation into controller 303-T.

At step 811, modulator 707 modulates the M base-band signals onto M narrow-band downlink channels at k sampling rate, in well-known fashion. The present invention is not limited to any particular type of modulation (e.g., amplitude modulation, frequency modulation or phase modulation). The present invention sets the k sampling rate for modulation, and modulator 707 processes the k sampling rate according to the modulation scheme used by the telecommunications system.

At step 802, controller 303-T determines the number of narrow-band downlink channels, N. encompassing the M narrow-band downlink channels that are to be transmitted as a downlink analog wide-band RF signal. For example, M may represent ten narrow-band channels (e.g., channels 1 to 5 and 16 to 20) out of a total of 20 (N=20) narrow-band channels (e.g., channels 1 to 20) that encompass the M narrow-band channels.

Figure 9:
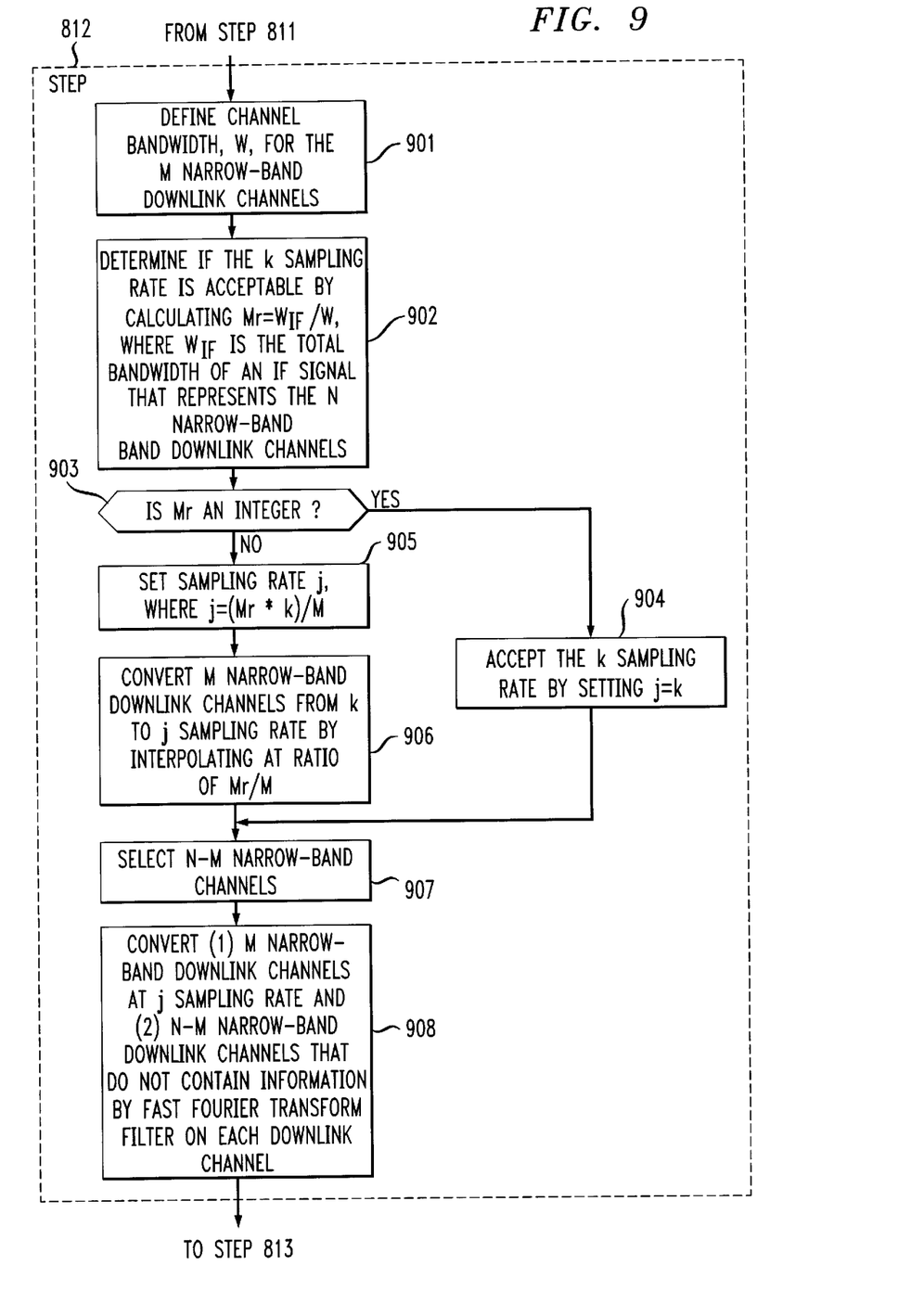
FIG. 9 depicts a flowchart of the operation of the present invention for processing of downlink RF channels.

At step 812, the M narrow-band downlink channels are advantageously converted into N narrow-band downlink channels. Details of step 812 are depicted in FIG. 9, which will be described below.

At step 901, controller 303-T determines the required channel bandwidth, W, for each of the M narrow-band downlink channels. For illustrative purposes, each of the M narrow-band downlink channels has a bandwidth of W. The present invention, however, is not limited to the processing of narrow-band downlink channels of a uniform bandwidth. The required bandwidth is set from telecommunications standards and system requirements, and it will be clear to those skilled in the art how to determine the required bandwidth for a given narrow-band downlink channel. For example, for a typical TDMA system the required bandwidth is specified at 30 kHz, and the operator of the telecommunications system inputs the required bandwidth into memory of controller 303-T.

At step 902, controller 303-T determines if the k sampling rate is acceptable for converting the M narrow-band downlink channels into an IF downlink digital signal by calculating Mr, which is a ratio of the total bandwidth of an IF downlink digital signal that represents the N narrow-band downlink channels, $W_{IF}$, to the narrow-band channel bandwidth, wherein Mr=$W_{IF}$/W. $W_{IF}$ is determined from the Nyquist rate, the required bandwidth and the number, N, of narrow-band channels, where $W_{IF} \geq$N*W. The Nyquist rate states that an analog signal must be sampled at least twice its bandwidth to digitally represent the information contained in such analog signal. Typically, controller 303-T sets $W_{IF}$ to minimum by setting $W_{IF}$=2*N*W.

At step 903, controller 303-T determines if Mr is an integer, in well-known fashion.

When controller 303-T determines that Mr is not an integer, then at step 905 controller 303-T sets the j sampling rate for converting the N narrow-band downlink channels into the IF downlink digital signal, where j=(Mr*k)/M. The j sampling rate is set to reconstruct the signal without loss of signal information by satisfying the Nyquist theorem for a minimum sampling rate of at least twice a given channel's bandwidth.

At step 906, first transmitting resampler 706 interpolates the M narrow-band downlink channels at a ratio of Mr/M (or at the j sampling rate), when Mr is not an integer. Interpolating a digital signal increases the sampling rate of such signal through a process of upsampling and filtering. If a digital signal has a sampling rate of R, an interpolator will increase the sampling rate by a factor, L, to produce a new sampling rate of R*L by systematically interpolating data between samples in the upsampling process. For example, when a signal has a sampling rate of 9 and is interpolated by a factor of three, the interpolator will interpolate data points to form a new signal with a sampling rate of 27. In this example, the interpolator performs integer interpolation because the L factor is an integer. Fractional interpolation is also possible and is typically achieved through a combination of decimation and interpolation.

An decimator will decrease sampling rate by a factor, D, by deleting selected data to produce a new sampling rate of R/D. A resampler will typically contain interpolators and decimators to change the sampling rate of a signal from R to R*L/D. If L>D, then the resampler is performing fractional interpolation. If L<D, then the resampler is performing fractional decimation. If L=D, then the rate is unchanged. For example, if a sampling rates is to be increased by ⅗ (fractional interpolation), this could be achieved as a cascade of an interpolator (L=5) followed by a decimator (D=3).

The j sampling rate, however, should be set to be able to reconstruct the signal without loss of signal information. Loss of signal information is avoided per the Nyquist theorem by setting the sampling rate for a channel at a rate of at least twice the bandwidth of the channel, in well-known fashion.

When controller 303-T determines that Mr is an integer, then at step 904 controller 303-T accepts the k sampling rate by setting the j sampling rate equal to the k sampling rate.

At step 907, narrow-band selector 705 selects the N–M narrow-band downlink channels.

Figure 9A:
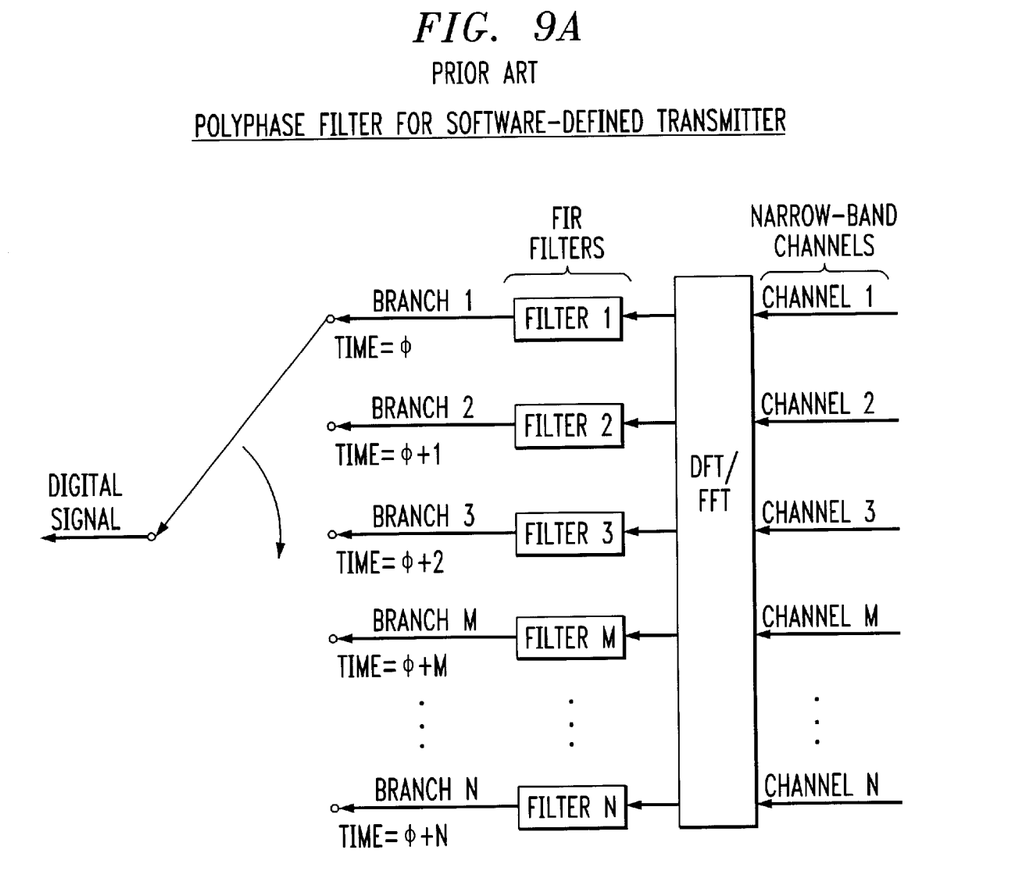
FIG. 9A depicts a schematic diagram for converting downlink channels into a digital signal.

At step 908, wide-band converter 704 converts (1) the M narrow-band downlink channels at the j sampling rate and (2) the N–M narrow-band downlink channels that do not contain information into the IF downlink digital signal by a inverse fast Fourier transform filter (IFFT) on each channel, in well-known fashion. As depicted in FIG. 9A, the M narrow-band channels enter designated branches of a inverse Discrete Fourier Transform (IDFT), such as a inverse Fast Fourier Transform (IFFT), where the M channels are organized into digital signals. The IFFT has a total of N branches, and the N–M channels are void of actual digital signals. The M output digital signals and the N–M signals from the IFFT each enter a Finite Impulse Filter (FIR) in which the digital signals are stored. A combined digital signal is formed by combining output signals from the FIR filters on a time basis of a time constant, $\phi$. Such an arrangement of IFFT transform followed FIR filters by a is called a polyphase filter. Polyphase filters can be cascaded for several stages to transform the wide-band analog RF signal into a large number of narrow-band channels, in well-known fashion. A large number of narrow-band channels are not typically processed within a single polyphase filter because the size of that polyphase filter would become too large to effectively process the numerous communications.

Returning to step 803 of FIG. 8, controller 303-T sets a sampling rate, i, at digital-to-analog converter 702. In some embodiments, controller 303-T sets the i sampling rate based on the rated capacity of digital-to-analog converter 702. In other embodiments, other sampling rates may suitably be used. The operator of the telecommunications system selects the i sampling rate for the digital-to-analog converter 702. As with abovedescribed analog-to-digital converter 402, during periods of low telecommunications traffic an operator of a telecommunications system may elect to operate digital-to-analog converter 702 at rates lower than rated capacity. At step 813, second transmitting resampler 703 changes the sampling rate of the IF downlink digital signal from j to i, in well-known fashion. The i sampling rate depends upon many variables, including type of communication (e.g., voice, data, image, etc.) and desired quality of the communication. For example, voice communication that has a highly intelligible signal with no noticeable reduction in speaker recognition, as compared to analog speech, will require higher transmission rates of data than voice communication where speaker recognition is substantially degraded.

Because the i sampling rate will often de different from the j sampling rate, second transmitting resampler 703 performs a conversion in data sampling rates. When i is less than j, second transmitting resampler 703 will decimate the N narrow-band downlink channels, in well-known fashion. When i is greater than j, second transmitting resampler 703 will interpolate the digital data in the N narrow-band downlink channels, in well-known fashion. If the i sampling rate is equal to the j sampling rate, then no decimation or interpolation is required. It will be clear to those skilled in the art when and how to select interpolation, decimation, or neither operation for preparing the N narrow-band downlink channels for transmission. As previously discussed, fractional interpolation or fractional decimation can be achieved through use of a cascade of integer interpolators and integer decimators.

At step 814, digital-to-analog converter 702 converts the IF downlink digital signal to an IF downlink analog wide-band signal at the i sampling rate, in well-known fashion.

At step 815, IF-to-RF converter 701 receives the IF downlink analog wide-band signal, converts it into a downlink analog wide-band RF signal. IF-to-RF converter 701 contains filters, mixers and amplifiers for converting the IF downlink analog wide-band signal into the downlink analog wide-band RF signal. IF-to-RF converter 701 forwards the downlink analog wide-band RF signal to transmit antenna 209, which transmits the downlink analog wide-band RF signal. The aforementioned conversion and transmission operations are well known in the art.

It is to be understood that the above-described embodiments are merely illustrative of the invention and that many variations may be devised by those skilled in the art without departing from the scope of the invention. It is therefore intended that such variations be included within the scope of the following claims and their equivalents.

What is claimed is:

1. A method comprising:
   receiving an uplink analog wide-band RF signal at a base station;
   converting, in a first converting step, said uplink analog wide-band RF signal into an IF uplink analog wide-band signal having a total bandwidth $W_{IF}$ and encompassing a quantity N of narrow-band uplink channels;
   converting, in a second converting step, said IF uplink analog wide-band signal into an IF uplink digital signal;
   wide-band down-converting said IF uplink digital signal into said N narrow-band uplink channels wherein said wide-band down-converting includes using a multi-rate filter bank,
   rejecting at least some of said down-converted narrow-band uplink channels;
   demodulating at least some non-rejected narrow-band uplink channels.

2. The method of claim 1, wherein said second converting step includes sampling said IF uplink analog wide-band signal at a first sampling rate i to obtain said IF uplink digital signal.

3. The method of claim 2, further including a step of sampling said IF uplink digital signal at a second sampling rate j when a ratio, Nr, of total bandwidth $W_{IF}$ to a bandwidth required for each narrow-band uplink channel, W, is not an integer.

4. The method of claim 3, wherein said step of sampling at said second sampling rate j includes decimating the IF uplink digital signal at a rate of i*(Nr/N).

5. The method of claim 2, further including a step of resampling said IF uplink digital signal at a sampling rate j that is equal to the sampling rate i when a ratio, Nr, of total bandwidth $W_{IF}$ to a bandwidth required for each narrow-band uplink channel, W, is an integer.

6. The method of claim 2, wherein said step of demodulating includes resampling narrow-band uplink channels using one of a cascaded integrator comb (CIC) filter and a Farrow-Filter followed by an array conversion filter using a nearest neighbor rule and linear interpolation.

7. The method of claim 1, wherein said multi-rate filter bank includes cascaded polyphase filters.

8. The method of claim 1, wherein the step of rejecting at least some of said down-converted narrow-band uplink channels comprises avoiding further processing of uplink channels to be rejected after said step of wide-band down-converting.

9. A wireless telecommunications system comprising:
   a receiver for receiving an uplink analog wide-band RF signal and for converting said uplink analog wide-band RF signal into an IF uplink analog wide-band signal having a total bandwidth, $W_{IF}$, and encompassing a quantity N of narrow-band uplink channels;
   an analog-to-digital converter for converting said IF uplink wide-band analog signal into an IF uplink digital signal;
   a controller for wide-band down-converting said IF uplink digital signal into said N narrow-band uplink channels wherein said controller is operative to implement a multi-rate filter bank for wide-band down-converting of said IF uplink digital signal; and
   a demodulator for demodulating a quantity M of said N narrow-band uplink channels, said controller being operative to reject a quantity N–M of said narrow band uplink channels.

10. The system of claim 9, wherein said analog-to-digital converter is operative to sample said IF uplink analog wide-band signal at a first sampling rate i to obtain said IF uplink digital signal.

11. The system of claim 10, wherein said controller is operative to implement resampling of said IF uplink digital signal at a second sampling rate j when a ratio, Nr, of total bandwidth $W_{IF}$ to a bandwidth required for each narrow-band uplink channel, W, is not an integer.

12. The system of claim 11, wherein said controller is operative to implement decimating the IF uplink digital signal at a rate of i*(Nr/N).

13. The system of claim 10, wherein said controller is operative to implement resampling of said IF uplink digital signal at a second sampling rate j that is equal to the sampling rate i when a ratio, Nr, of total bandwidth $W_{IF}$ to a bandwidth required for each narrow-band uplink channel, W, is an integer.

14. The system of claim 9, wherein said demodulator is operative to resample narrow-band uplink channels using a cascaded integrator comb (CIC) filter.

15. The system of claim 9, wherein said demodulator is operative to resample narrow-band uplink channels using a Farrow-Filter followed by an array conversion filter according to a nearest neighbor rule and linear interpolation.

16. The system of claim 9, wherein the multi-rate filter bank implemented by said controller includes cascaded polyphase filters.

* * * * *